United States Patent [19]
Li et al.

[11] Patent Number: 6,119,165
[45] Date of Patent: *Sep. 12, 2000

[54] CONTROLLED DISTRIBUTION OF APPLICATION PROGRAMS IN A COMPUTER NETWORK

[75] Inventors: Bobby Li; Eva Chen, both of Cupertino, Calif.

[73] Assignee: Trend Micro, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/971,990

[22] Filed: Nov. 17, 1997

[51] Int. Cl.[7] .............................. G06F 9/455; G06F 15/16
[52] U.S. Cl. ........................... 709/229; 709/218; 709/224
[58] Field of Search .................... 395/200.51, 200.32, 395/680, 652; 709/226, 227, 228, 229, 230, 232, 218

[56] References Cited

U.S. PATENT DOCUMENTS

| | | | |
|---|---|---|---|
| 5,347,632 | 9/1994 | Filepp et al. | 395/200 |
| 5,623,601 | 4/1997 | Vu | 395/187.01 |
| 5,754,830 | 5/1998 | Butts et al. | 709/227 |
| 5,781,703 | 7/1998 | Desai et al. | 395/200.54 |
| 5,826,014 | 10/1998 | Coley et al. | 395/187.01 |
| 5,848,246 | 12/1998 | Gish | 395/200.58 |

OTHER PUBLICATIONS

Wu et al. "Virtual Proxy Servers for WWW and Intelligent Agents on the Internet", System Science, 1997 Proceeding of the 13th hwaii Intern. Conf., pp200–209 v4, Jan. 1997.

*Primary Examiner*—Dung C. Dinh
*Attorney, Agent, or Firm*—Skjerven Morrill MacPherson LLP; Norman R. Klivans; Daniel P. Stewart

[57] ABSTRACT

In an Internet or Intranet environment, a proxy server (or router or intelligent switch or firewall) which supports a number of clients (e.g. web browsers) has additional functionality which allows it to deliver a software module to a particular client depending on characteristics of that client. This downloaded module is then executed by the client which sets up a bidirectional communications link between the proxy server and the client. This bidirectional link allows for instance a status display at the client, by use of a window on the client platform, indicating the current status of proxy server activity such as virus scanning, content filtering, bandwidth usage, etc. In other applications the downloaded module allows provision of a organizational bulletin board, news channel, or provider of common software patches.

26 Claims, 4 Drawing Sheets

CONTROLLED DISTRIBUTION OF APPLICATION PROGRAMS IN A COMPUTER NETWORK

BACKGROUND

1. Field of the Invention

This invention relates to computer networks and more specifically to Internet or Intranet networks and to bidirectional communication between a client and an agent, such as a proxy server, in such networks.

2. Description of the Prior Art

In the Internet/Intranet context, proxy servers are well known; a proxy server is a computer software entity which is resident on a "platform," typically a computer. The proxy server typically is connectable to a number of client platforms (computers) on each of which is running client software (a "client") such as a world wide web browser ("web browser"). Typically in use the client accesses a remote web server via the Internet or an Intranet. The remote web server is another computer platform on which is resident software which supports a web site. The client (web browser) then downloads web pages from the web server, via the proxy server. Sometimes these web pages include applets such as Java applets or other types of application programs which are code modules (software) executable by the client.

SUMMARY

In accordance with this invention, the capabilities of a proxy server or other similar "agent" in an Internet or Intranet environment (other examples of agents being a firewall, a router or other type of intelligent switch) are extended by adding software to the agent, to allow the agent to intelligently deliver an application program (or other code module) to a client. More broadly, an "agent" includes (but is not limited to) any entity in a computer network that serves as a transmission intermediary, including any entity performing a routing, switching, filtering, or screening function for connections or for data. For example, in Intranet networks, such agents often are nodes which every client must pass to access the external Internet or web servers. In this sense, an "agent" would not be a source of content such as a web server supporting a web site.

"Intelligently" means that in some cases the delivered code module is personalized or selected to the particular client. The web browser client is forced to download the delivered code module instead of the intended web page. The delivered code module is executed by the client and can then perform some function on the client and in some embodiments communicate with the agent (e.g. proxy server) bidirectionally, i.e. with information being transferred both ways.

The application program which is delivered is for instance any type of code (software) module or scripting language capable of being executed by the client. Where the client is a web browser, examples of delivered application programs include Java applets, Active-X controls or other types of executable software modules. Typically the agent determines a characteristic(s) of the client and intelligently selects or forms a particular code module in response to the determined characteristic of the client. The agent then downloads this code module down to the client, resulting in the code module being resident at the client, to be executed thereby.

The code module may be personalized to the client, or may be selected from a group of available code modules, or may be a standard code module. The following steps occur:

1. The client connects to the agent
2. Software resident at the agent determines if the application program should be delivered.
3. The application program is delivered and communication is established between the delivered application program and the software resident at the agent.

In one exemplary embodiment, the delivered code module is a Java applet which is executed at the client and upon execution reports at the client a status of a virus scan being performed by the proxy server (agent). This is useful where the virus scan is of a type resident at the proxy server rather than at the client. This reporting of the status of the virus scan, in the form of a displayed window on the client platform, indicates to the user of the client what is the status of the virus scan, and therefore the user knows that any delay is due to the virus scan rather than a failure on the part of the proxy server.

In another embodiment, the delivered code module allows the client to monitor the connection between the client and a remote site (a web server) and thereby function for instance as a network management agent, a filter or a security firewall. In this case the delivered code module may in some situations, upon occurrence of a predetermined event, direct the agent (e.g. proxy server) to terminate the connection between the client and the remote web server, for instance upon an attempt to download particular web site material such as adult material. Also if there is an appearance of material which is in violation of for instance a firewall security policy, the connection may be terminated in this situation. Hence such filtering functions may be personalized to each client.

DETAILED DESCRIPTION

The following description is of certain embodiments in accordance with this invention and is not limiting. This disclosure assumes familiarity with well known aspects of Internet/Intranet computer networking, all of which are well known and commercially available and hence are not disclosed in any particular detail herein.

Figure 1:
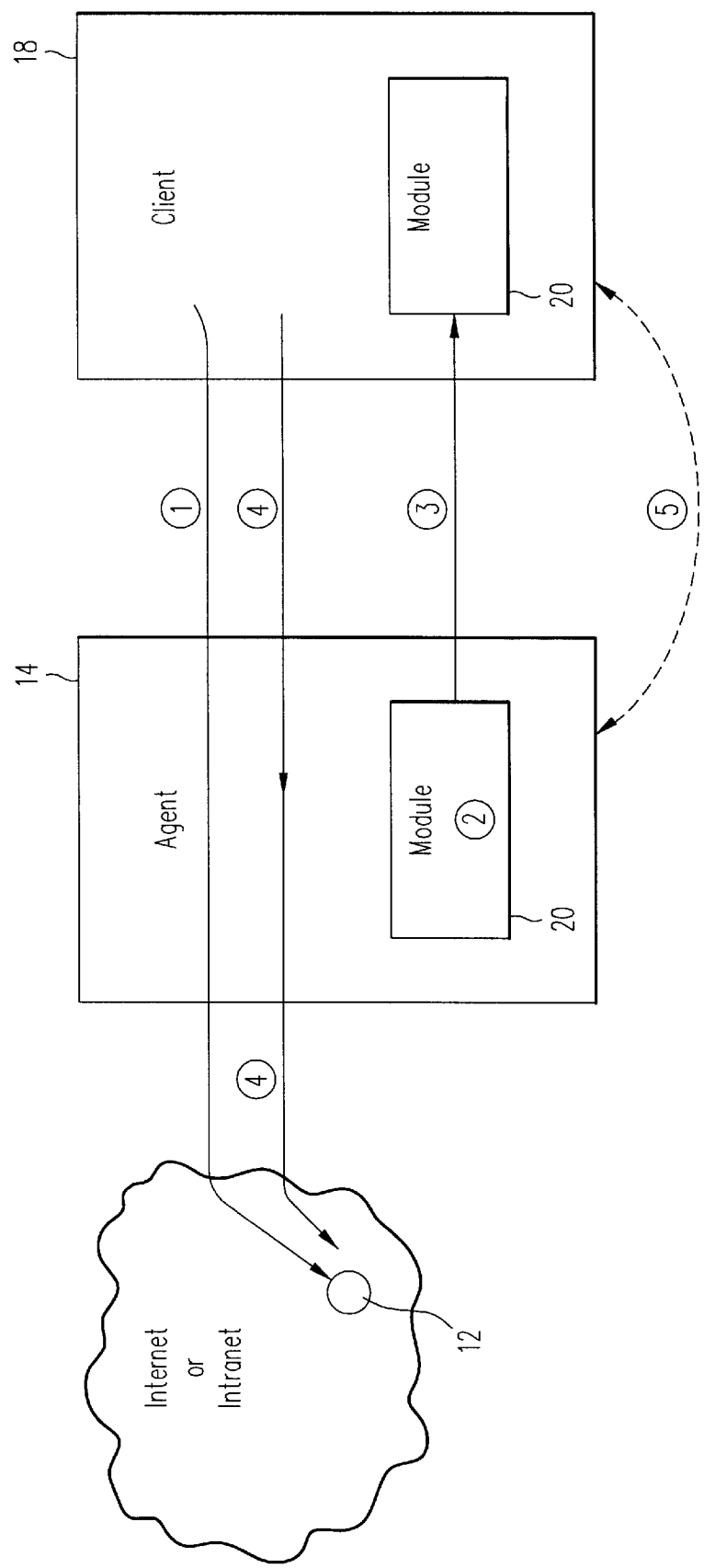
FIG. 1 shows a general diagrammatic depiction of an application delivery method in accordance with this invention.

FIG. 1 shows diagramatically an application program delivery method in accordance with this invention. The entities shown include a web server 12 (or equivalent), for instance on the Internet or on an Intranet. Agent 14 is in one embodiment a proxy server, of the type disclosed above, with certain modifications; it is to be understood that a proxy server is a software entity executed on a proxy server platform (computer). Such proxy servers are commercially available, for instance from Microsoft or other vendors; the Microsoft proxy server software is called Microsoft Proxy Server. It is to be understood one embodiment of the present invention takes the form of additional code which runs on the agent (proxy server) platform, and which may be embedded in the conventional proxy server software as additional functionality thereto. This additional code is not shown here but can be written by one of ordinary skill in the art in the light of this disclosure.

The third entity shown is the client 18 which is e.g. a web browser such as the well known Microsoft Explorer or Netscape Navigator. The web browser is a type capable of executing the delivered application program. For instance, if the delivered application program is a Java applet, the client must be capable of supporting Java, i.e. include a Java virtual machine. Of course if the delivered application program is an Active-X control, the client must have the capability to execute same, for instance the Microsoft Internet Explorer browser.

In FIG. 1, the first step is that conventionally the client 18 attempts to connect to the web server 12 via the agent 14. The agent 14 is not necessarily a proxy server, but may be for instance a router or other type of intelligent switch of the type typically used in the Internet/Intranet environment.

In second step, the agent (software) 14 determines a pertinent status or characteristic of the client 18, such as the client's Internet (IP) address, and then dynamically, i.e. in response to the determined status or characteristic, forms a particular software code module 20 (an application program such as a Java applet). Thus the nature of the particular code module 20 may be dependent on the determined characteristic(s) of the client 18 and may be different ("personalized") for particular clients. In some embodiments, the module 20 is not so personalized.

In the third step, the agent 14 delivers (downloads) this particular code module 20 to the client 18 so that code module 20 resides at the client and may be executed thereby. For instance, module 20 is a Java applet to be executed by the Java virtual machine which is part of the client 18.

In the fourth step, the agent 14 conventionally connects to the web server (or other site) 12 on behalf of the client 18. This step can be initiated by the delivered code module 20 also.

The fifth step is for the delivered code module 20 (or the client) to establish a communications link with the software running on the agent, if needed.

Also at this point the agent 14 may transmit information down to the delivered code module 20 running in the client 18, for instance information to indicate particular activity in the agent 14 such as the status of a virus scan being performed by the agent 14. A bidirectional connection is thereby established in the fifth step for reporting information between the agent 14 and the client 18. This capability is not available in the prior art.

Figure 2A:
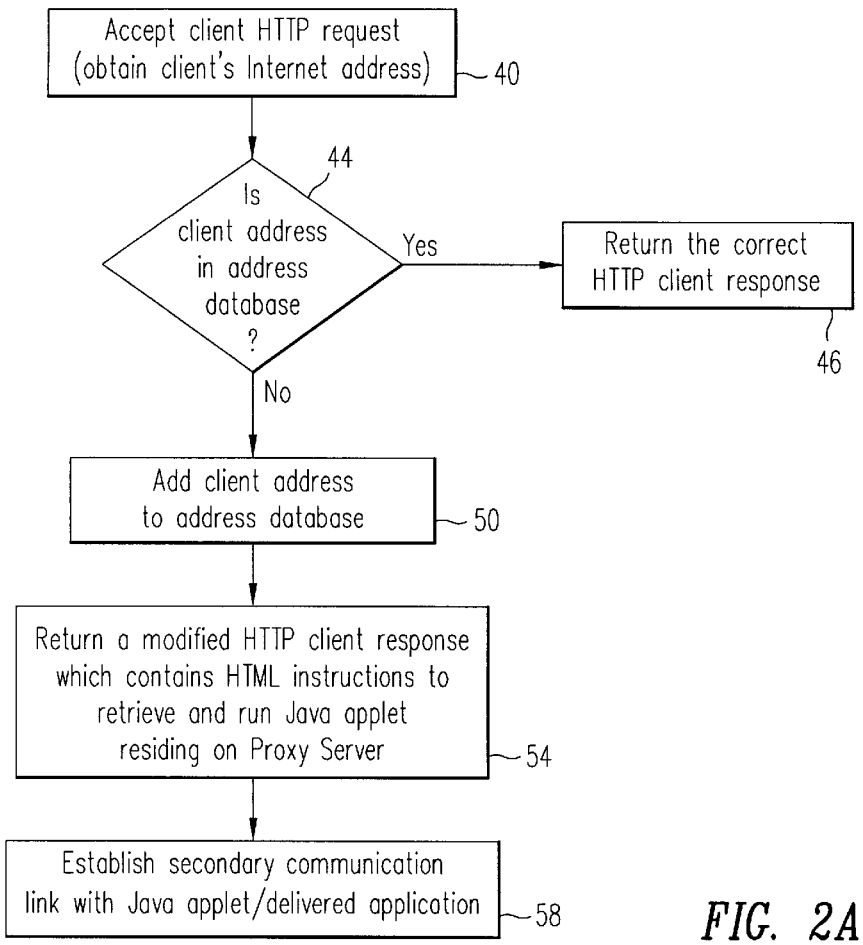
FIG. 2A shows a flow chart of use of the present application delivery method.

A more detailed process of this type as illustrated in FIG. 2A, where the agent 14 is a proxy server, is as follows:

1. The client 18 is a web browser, which is configured e.g. to support Java, begins its conventional execution and attempts to connect to the proxy server 14 for the first time to begin a session by submitting a conventional HTTP request to the proxy server in step 40.

2. The proxy server 14 compares the IP address of the client web browser 18 with a list of the IP addresses of the clients it currently considers to be connected to the proxy server and does the following:

a. If the client 18 is on the list of addresses, the proxy server 14 processes the HTTP request normally. This is because the assumption is that the particular application program 20 to be delivered is already resident at the client 18 and thus need not be delivered again to the client.

b. If the client 18 is not on the list, then the proxy server 14 assumes that there is a need to deliver the application program 20 to the client. The proxy server 14 thereby answers the HTTP request with a modified HTML (hyper-text mark up language) page (for instance a web page) which instructs the client 18 to load the application program 20 from the proxy server 14 in step 54. Thus after the delivered application program 20 is loaded by the client 18, i.e. is resident on the client platform, this application program 20 automatically started by the client 18. The original HTTP request is filled in one of two ways:

i) The modified HTML page contains the original response HTML page along with additional HTML code appended by the proxy server.

ii) When the delivered application program 20 starts execution, the application will make the web browser 18 re-submit the original HTTP request.

c. While the delivered application program 20 is executing on the client 18, it performs tasks as intended by the added software on the proxy server 14. Since the delivered application program and the proxy server both know each other's IP address, they can communicate bidirectionally via the conventional network connections using conventional data packets.

For instance, the bidirectional communication (step 5 in FIG. 1) can include reporting from the proxy server to the client the status of a virus scan being performed by the proxy server. In one embodiment, to determine if the delivered application program is in communication with the proxy server, the proxy server either looks for or is notified by one of more of the following events by the delivered application program:

a) "Delivered application program is running on client."
   b) "Delivered application program is timed out." (This occurs when the proxy server stops receiving "Delivered application is running on client" events after a predetermined time interval.) These events allow the agent software to determine if a client is still connected to it.
   c) "Delivered application program has exited."

Typically the proxy server will only deliver one instance of the particular application program down to the client. There may be exceptions, for instance when multiple delivered application programs are needed to achieve a desired result. In this situation the proxy server counts how many instances of the delivered application program are running and if needed deliver another application.

FIG. 2A shows a more detailed flow chart of one particular embodiment of the present invention, where the agent is a proxy server, the client is a web browser, and the application program which is delivered to the client is an HTML page (window) which indicates the status of a virus scan being executed by the proxy server on information downloaded from the remote web site which the client is attempting to access. The actual virus scanning at the proxy server is conventional, using for instance the Interscan package commercially available from Trend Micro.

Figure 2B:
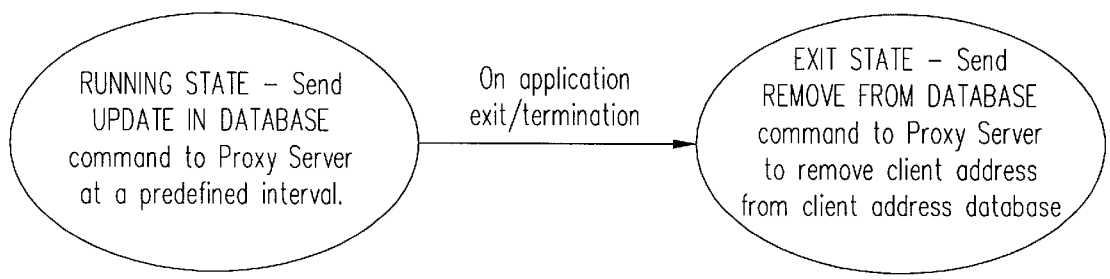
FIGS. 2B and 2C are state diagrams relating to FIG. 2A.

FIG. 2B is a state diagram of the delivered application program showing its two basic states—the RUNNING state and, upon the application exiting or termination, the EXIT state. (The thread of execution shown in FIG. 2B is used only if the above-described secondary agent to application program communications link is via UDP datagrams.)

Figure 2C:
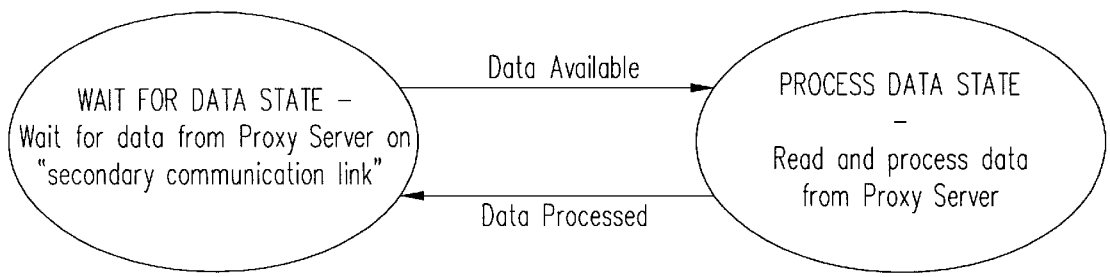

FIG. 2C shows a second thread of execution state diagram of the delivered application program showing the WAIT FOR DATA state and the PROCESS DATA state, with the state transitions occurring upon data being available or the data having been processed.

Figure 2D:
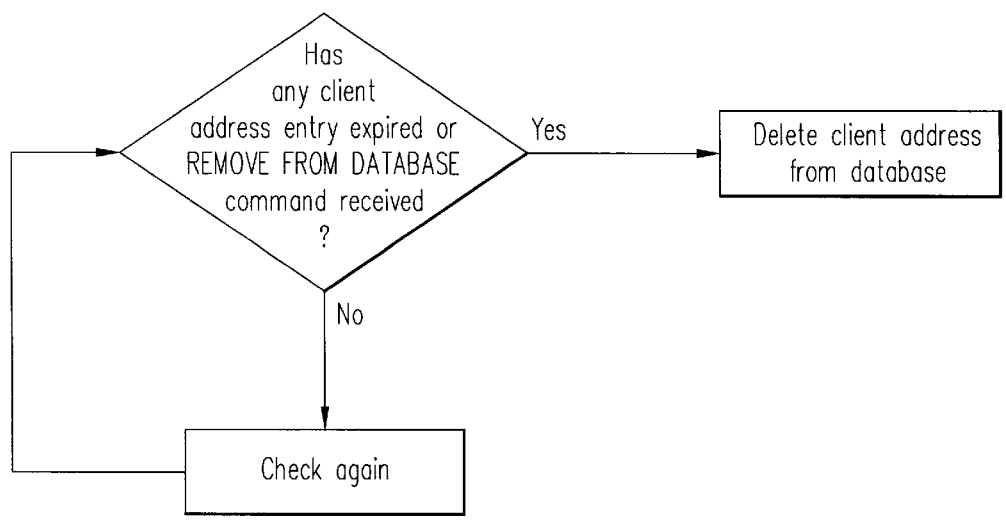
FIG. 2D shows an additional flowchart relating to FIG. 2A.

FIG. 2D shows a state diagram for the corresponding client address database processing at the proxy server, for the action REMOVE FROM DATABASE of a client address.

In one particular embodiment, an HTML page including a Java applet is downloaded from the proxy server to the client to report the status of the proxy server virus scanning. Since the communication link between the Java applet and the software at the proxy server has been established, one can send the Java applet the virus scan status as needed; this status information is displayed by the applet. This obviates the prior art situation where during a virus scan performed by a proxy server, the user of the client has no indication of what is happening and may think that a long virus scanning delay is the result of a fault rather than merely the usual delay. During this virus scanning time, the Java applet provides a window, shown in the upper left of FIG. 3, indicating the virus scan status. This window illustrates transmission of information from the proxy server to the client; the flow of information is from the client back to the proxy server in other examples, such as a personalized "firewall", bandwidth monitor, and content filter, which require two-way communication.

Figure 3:
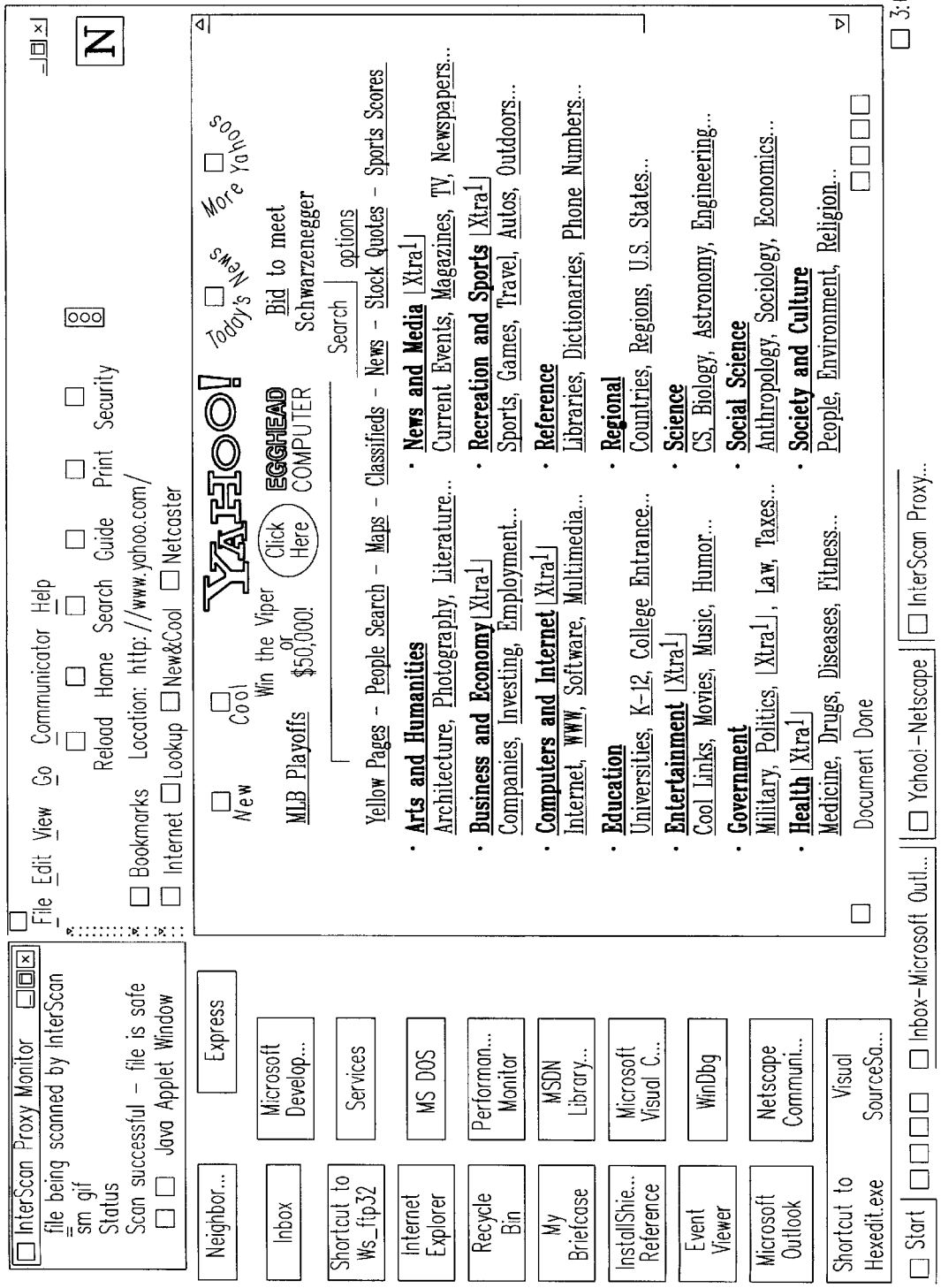
FIG. 3 shows a screen display relating to FIG. 2A.

This delivered Java applet is automatically loaded and started when the user starts up his web browser. The illustrative "Yahoo" web page shown in FIG. 3 is otherwise conventional and the delivered Java applet is loaded without user intervention. Such a virus scanner is a specific example of a proxy server status display which allows the client to display the current status of proxy server activity such as virus scanning, content filtering, malicious code scanning, etc. This allows display, by use of a window on the client platform display, to illustrate the status of processing by the proxy server beyond the traditional web browser proxy server functions.

Note that in accordance with the invention the client and the agent maintain an intelligent (bidirectional) communications channel therebetween, which is not limited to the HTTP protocol. This allows monitoring of all activity on the client and can notify the agent for instance to disconnect upon occurrence of certain events.

Other examples of the present application delivery approach include a network management agent that reports and controls the bandwidth (in terms of time and/or information flow) that is used by a certain client when communicating with an agent. Another example is a personalized (client specific) security "firewall" that is centrally controlled (at the proxy server) in terms of setting its firewall security provisions. This allows the client, in real time, to monitor the connection to itself and then notify the agent to filter out any specific traffic, and vice versa also.

In another example, the delivered application program is used as an Internet policy enforcement agent. For example, before granting a connection from the client to the Internet, the agent checks the client for a particular user name and proper security setting for the client.

Another example of the present delivered application program is generally the category of news agents or channels which allows an organization to post relevant information on its proxy server to be distributed to users (e.g. organization members) who access the Internet/Intranet through that organization's proxy server. Database information is maintained on the organization's proxy server which delivers the proper application program to each client to view the database each time the Internet/Intranet is accessed through that proxy server. The information might include for instance network status, organization events, or other news.

Another related example is a software patch/library agent in which the proxy server contains a program which searches the Internet/Intranet for various latest software packages available. When a user connects to the proxy server, the versions of the software on his particular client platform are compared to the latest versions of this software stored on the proxy server. If there is a newer software package or patch available, the user of each client is prompted to download that newer version.

This description is illustrative and not limiting; further modifications will be apparent to one skilled in the art in light of this disclosure and are intended to fall within the scope of the appended claims.

We claim:

1. In a computer network including a remote server, an agent, and a client, a method comprising the steps of:
   the client attempting to connect to the remote server through the agent;
   the agent determining a characteristic of the client and providing a code module in response to the determined characteristic;
   the agent downloading the code module to the client, resulting in the code module residing at the client;
   the client executing the code module;
   the agent forming a connection to the remote server on behalf of the client; and
   the code module reporting to the client a status of an operation performed by the agent, the operation relating to the connection formed between the agent and the remote server.

2. The method of claim 1, wherein the agent is an intermediary entity for providing connectivity or transmitting data between the remote server and the client.

3. The method of claim 2, further comprising the step of the client reporting its status to the agent, whereupon the agent determines if the connection is to be continued.

4. The method of claim 2, further comprising the step of establishing bidirectional communications between the agent and the client via the downloaded code module.

5. The method of claim 2, wherein the client is a web browser.

6. The method of claim 2, wherein the agent is one of a router, an intelligent switch, a proxy server, and a firewall.

7. The method of claim 2, wherein the downloaded code module is an application program.

8. The method of claim 7, wherein the downloaded code module is selected from a group consisting of a Java applet, an Active-X control, and any application executable software supported by the client.

9. The method of claim 2, wherein the step of providing comprises selecting from a group of code modules.

10. The method of claim 1, wherein the operation is a virus scan.

11. The method of claim 2, wherein the code module allows the client to monitor a status of the connection to the remote server.

12. The method of claim 3, wherein the downloaded code module directs the agent to terminate the connection upon occurrence of a predetermined event.

13. The method of claim 2, wherein the step of providing comprises dynamically forming the code module.

14. An agent for use in a computer network including a remote server and a client to be connected to the remote server via the agent, the agent comprising:
   a portion which determines at least one characteristic of the client in response to the client attempting to connect to the remote server through the agent;

a portion which provides a code module in response to the determined characteristic of the client;

a portion which downloads the code module to the client so that the code module resides in the client; and a portion which forms a connection to the remote server on behalf of the client;

wherein the code module is operable to report to the client a status of an operation performed by the agent, the operation relating to the connection formed between the agent and the remote server.

15. The agent of claim 14, wherein the operation is a virus scan.

16. The agent of claim 14, wherein the agent is an intermediary entity for providing connectivity or transmitting data between the remote server and the client.

17. The agent of claim 16, wherein the client reports its status to the agent using the downloaded code module, whereupon the agent determines if a connection between the client and the web server is to be continued.

18. The agent of claim 16, further comprising a portion which establishes bidirectional communications between the agent and the client via the downloaded code module.

19. The agent of claim 16, wherein the client is a web browser.

20. The agent of claim 16, wherein the agent is one of a router, an intelligent switch, a proxy server, and a firewall.

21. The agent of claim 16, wherein the downloaded code module is an application program.

22. The agent of claim 21, wherein the downloaded code module is selected from a group consisting of a Java applet, an Active-X control, and any application/executable software supported by the client.

23. The agent of claim 16, wherein the code module is formed dynamically.

24. The agent of claim 18, wherein the code module is selected from a group of code modules.

25. The agent of claim 16, wherein the code module allows the client to monitor a status of the connection to the remote server.

26. The agent of claim 16, wherein the downloaded code module directs the agent to terminate the connection upon occurrence of a predetermined event.

* * * * *